United States Patent

Ishima et al.

Patent Number: 6,061,168

Date of Patent: May 9, 2000

[54] ALL-SOLID ELECTROCHROMIC ANTI-GLARE MIRROR

[75] Inventors: Yoshiaki Ishima; Osamu Nawamaki; Hideyuki Kikuchi, all of Shizuoka-ken, Japan

[73] Assignee: Murakami Kaimeido Co., Ltd., Shizuoka-ken, Japan

[21] Appl. No.: 09/289,904

[22] Filed: Apr. 12, 1999

[30] Foreign Application Priority Data

Apr. 14, 1998 [JP] Japan ................................. 10-103132
Dec. 7, 1998 [JP] Japan ................................. 10-347613

[51] Int. Cl.⁷ ............................................. G02F 1/155
[52] U.S. Cl. ....................... 359/266; 359/265; 359/267
[58] Field of Search .................................. 359/265, 266, 359/269, 272, 274, 275, 267

[56] References Cited

U.S. PATENT DOCUMENTS

| | | | |
|---|---|---|---|
| 5,136,419 | 8/1992 | Shabrang | 359/265 |
| 5,187,607 | 2/1993 | Endo et al. | 359/266 |
| 5,253,100 | 10/1993 | Yang et al. | 359/266 |
| 5,307,201 | 4/1994 | Passerini et al. | 359/266 |

*Primary Examiner*—Loha Ben
*Attorney, Agent, or Firm*—Knobbe, Martens Olson & Bear, LLP

[57] ABSTRACT

A flat type all-solid electrochromic anti-glare mirror includes a flat, transparent glass substrate, the back face of which is coated with a transparent conductive coating, an all-solid electrochromic layer, and a conductive-reflective coating. In the above, the outer surface of the conductive-reflective coating and the electrochromic layer is fully covered with a resin layer made of a material that has resistance to wetness, moisture, and corrosion and functions to block migration of ions, without the use of a sealing glass plate.

14 Claims, 2 Drawing Sheets

ALL-SOLID ELECTROCHROMIC ANTI-GLARE MIRROR

BACKGROUND OF THE INVENTION

1. Field of the Invention

The present invention relates to an electrochromic anti-glare mirror, used for automotive interior and exterior rearview mirrors, and especially to a seal structure for an all-solid electrochromic anti-glare mirror.

2. Description of the Related Art

It is known that an electrochromic optical device controls the occurrence and extinction of redox reaction which generates a color when the electrochromic material is charged with an electric field. Recently, the electrochromic optical device has been used for anti-glare mirrors.

FIG. 1 and FIG. 2 show the prior art of the structure of an electrochromic anti-glare mirror. FIG. 1 shows a flat type electrochromic anti-glare mirror. The flat type electrochromic anti-glare mirror 1 comprises a flat, transparent glass substrate 2, the back face of which is coated with a transparent conductive coating 3, an all-solid electrochromic layer 4, and a transparent reflective-conductive coating 5. Both of the electrochromic layer 4 and the reflective-conductive coating 5 are covered with a sealing resin 6. A sealing glass plate 7 is attached to the back surface of the sealing resin 6.

The all-solid electrochromic layer 4 comprises an iridium oxide film 8 as an oxide color-forming film, a $Ta_2O_5$ film 9 as an electrolyte film, and a $WO_3$ film 10 as a reductive color-forming film. The reflective-conductive coating 5 comprises an Al film. These films 8, 9, 10 are laminated by a process such as vapor deposition.

Color formation and extinction is described as follows. The iridium oxide film 8 contains $H_2O$ in the form of $Ir(OH)_n$. When a terminal 3a of the transparent conductive coating 3 is connected to a positive terminal of a DC power source, and a terminal 5a of the reflective-conductive coating 5 is connected to a negative terminal of the DC power source, $H^+$ protons move in the iridium oxide film 8 to the $Ta_2O_5$ film 9, and $e^-$ electrons are released into the transparent conductive coating 3. As a result, oxidation occurs in the $Ta_2O_5$ film 9 to generate a color, as follows:

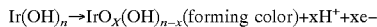

$Ir(OH)_n \rightarrow IrO_x(OH)_{n-x}$(forming color)$+xH^+ + xe-$ $H^+$ protons migrate from the $Ta_2O_5$ film 9 to the $WO_3$ film 10, and $e^-$ electrons move from the reflective-conductive coating 5 into the $WO_3$ film 10. As a result, reduction occurs in the $WO_3$ film 10 to generate a color.

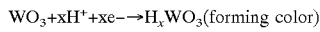

$WO_3 + xH^+ + xe- \rightarrow H_xWO_3$(forming color)

When reversing the DC power positive and negative terminals, reduction occurs in the iridium oxide film 8 to extinguish the color, and oxidation occurs in the $WO_3$ film 10 to generate the color, wherein $H_2O$ contained in the $Ta_2O_5$ film 9 is ionized to convert to $H^+$ protons and $OH^-$ ions which contribute highly to color formation and extinction.

The sealing glass plate 7 is used to support the electrochromic layer 4 and the reflective-conductive coating 5 by providing mechanical strength from the outside surface, and to increase its resistance to water, moisture, and corrosion. Furthermore, the sealing glass plate 7 blocks ion migration to prevent radiating $H^+$ protons and $OH^-$ ions from the coating and absorbing the same from the outside so as to maintain the quantity of $H^+$ protons and $OH^-$ ions contained in the electrochromic layer 4 at a constant level. As a result, the reaction of color formation and extinction is maintained preferably in the electrochromic layer 4.

FIG. 2 shows the conventional structure of an electrochromic anti-glare mirror of a curved type. This type of the electrochromic anti-glare mirror (the curved type mirror) 11 has very nearly the same structure as the above-mentioned flat type. The curved type mirror 11 comprises a flat, transparent glass substrate 12, a transparent conductive coating 13, an all-solid electrochromic layer 14, a reflective-conductive coating 15, and a sealing plate 17. However, each of the above-mentioned elements is formed in a desired curved shape. As a result, the whole structure of the mirror 11 has a curvature.

The all-solid electrochromic layer 14 comprises an iridium oxide film 18 as an oxide color-forming film, a $Ta_2O_5$ film 19 as an electrolyte film, and a $WO_3$ film 20 as a reductive color-forming film. The conductive coating 15 comprises an Al film. These films 18, 19, 20 are laminated by a process such as vapor deposition.

In the above electrochromic anti-glare mirror 1/11, when a voltage is applied between the transparent conductive coating 3/13 and the reflective-conductive coating 5/15, both of the iridium oxide film 8/18 and the $WO_3$ film 10/20 promote redox reaction as described above to generate a color, thereby reducing reflection of the mirror.

Reducing the reflection rate of the mirror makes it possible to reduce glare of reflecting light caused by headlights of a vehicle to the rear. When a voltage is applied in the opposite direction, each of the iridium oxide film 8/18 and the $W_3$ film 10/20 promotes redox reaction in the reverse direction. As a result, the color is extinguished, thereby causing a reflection rate in a usual range.

There are several problems to be solved for the conventional electrochromic anti-glare mirrors:

(1) The weight of the electrochromic anti-glare mirror 1/11 is heavy because of the sealing glass plate 7/17. The sealing glass plate 7/17 serves to block ion migration to maintain the function of the all-solid electrochromic film 4/14 at a normal level. Thus, the problems cannot be solved simply by removing the sealing glass plate 7/17.

(2) In the curved type mirror 11, the curvature of the sealing glass plate 17 must coincide with the curvature of the glass substrate 12. If there is a difference in curvature between the sealing glass plate 17 and the glass substrate 12, an uneven gap and an uneven thickness of the sealing resin disposed between the sealing glass plate 17 and the glass substrate 12 occur. The unevenness causes internal stress in the mirror 11, easily separating the elements of the mirror.

(3) In production of the curved type mirror 11, it is costly to achieve high accuracy of the curvature of both the sealing glass plate 17 and the glass substrate 12.

SUMMARY OF THE INVENTION

The objective of the present invention is to provide a sealing structure for an electrochromic anti-glare mirror to have the sealing function equivalent to that of the conventional sealing plate, without using the conventional sealing plate, as well as to reduce the weight of the mirror.

Another objective of the present invention for the curved type mirror is to prevent the elements of the mirror from being separated or detached caused by internal stress generated especially in the curved type mirrors.

BRIEF DESCRIPTION OF THE DRAWINGS

The present invention will be described in further detail with reference to the accompanying drawings.

DETAILED DESCRIPTION OF THE PREFERRED EMBODIMENT

Figure 3:
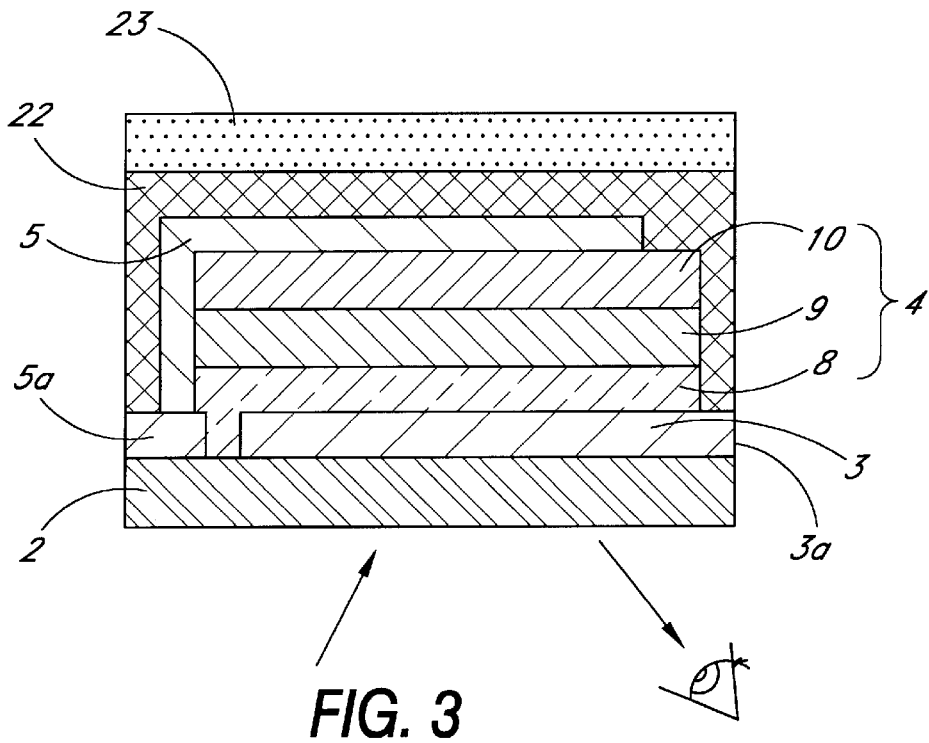
FIG. 3 is a schematic cross-sectional view of an embodiment of an all-solid electrochromic anti-glare mirror according to the present invention.

Referrng to FIG. 3 and FIG. 4, the Invention is explained in detail as follows: FIG. 3 shows a first embodiment of the present invention which is a flat type electrochromic anti-glare mirror. The flat type electrochromic anti-glare mirror 21 comprises a flat, transparent glass substrate 2, the back face of which is coated with a transparent conductive coating 3, an all-solid electrochromic layer 4, and a conductive coating 5 which also serves as a reflective element (a reflective-conductive coating).

The all-solid electrochromic layer 4 comprises iridium oxide film 8 as an oxide color-forming film, a $Ta_2O_5$ film 9 as an electrolyte film, and a $WO_3$ film 10 as a reductive color-forming film. The reflective-conductive coating 5 comprises an Al film. These films 8, 9, 10 are laminated by a process such as vapor deposition.

The color formation and extinction reactions in the $Ta_2O_5$ film 9 and the $WO_3$ film 10 are the same as in the conventional flat-type electrochromic anti-glare mirror.

The most unique point of the present invention resides in the sealing structure which replaces the conventional sealing glass plate 7. The sealing structure of the present invention, which is comprised of a sealing resin film 22, fully covers both of the electrochromic layer 4 and the reflective-conductive coating 5. That is, the upper surface of the reflective-conductive coating 5 and the sides of the reflective-conductive coating 5 and the electrochromic layer 4, which are not in contact with the glass substrate 2, are covered with the sealing resin film 22. The sealing resin film 22 replaces both the conventional sealing resin 6 and the conventional sealing glass 7.

Figure 1:
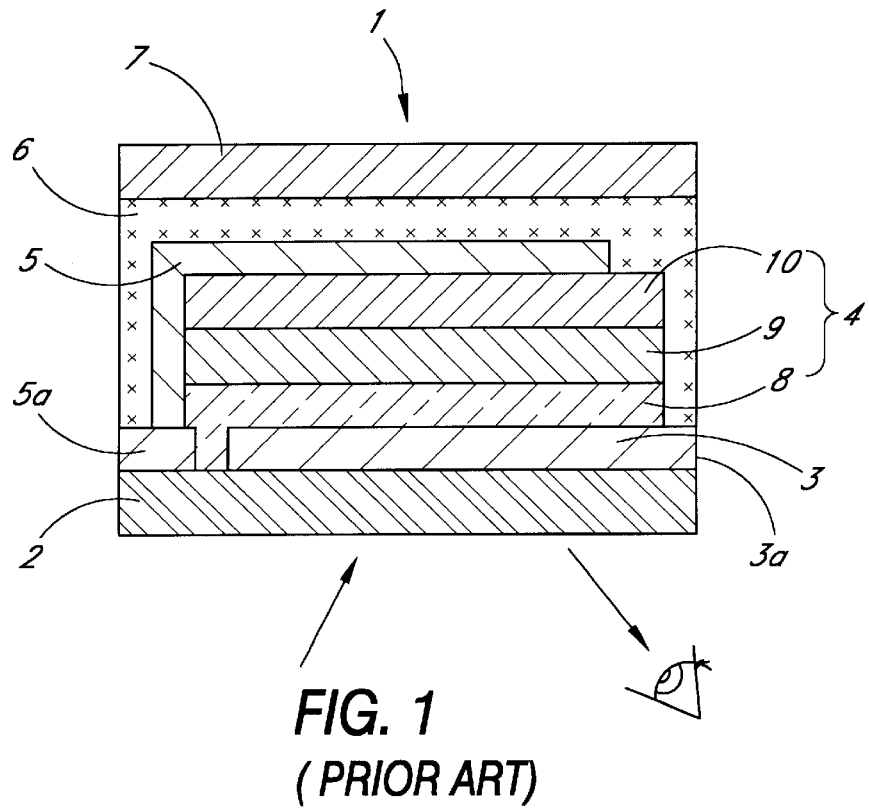
FIG. 1 is a schematic cross-sectional view of a prior art of an all-solid electrochromic anti-glare mirror of a flat type.
Figure 2:
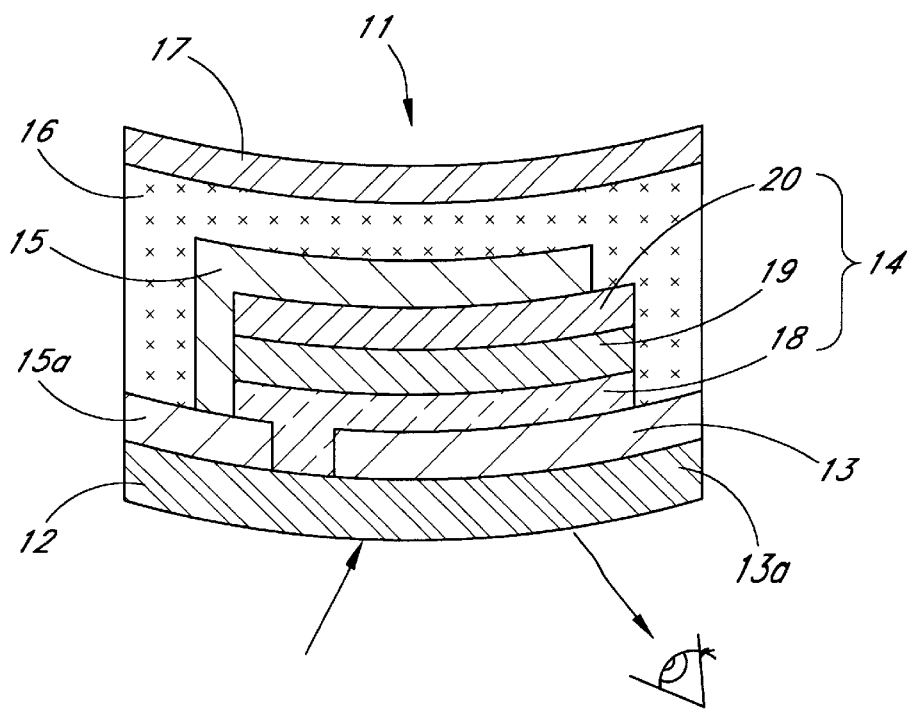
FIG. 2 is a schematic cross-sectional view of another prior art of an all-solid electrochromic anti-glare mirror of a curved type.

As shown in FIG. 1 and FIG. 2, the conventional sealing resin 6/16 serves to seal both of the electrochromic layer 4/14 and the reflective-conductive coating 5/15 together.

The conventional sealing glass plate 7/17 servers to support the electrochromic layer 4/14 and the reflective-conductive coating 5/15 by providing mechanical strength from the outer surface, and to give resistance to water, moisture, and corrosion. Furthermore, the sealing glass plate 7/17 blocks ion migration.

The blocking mechanism of ion migration is explained as follows: As mentioned above, the quantity of $H^+$ protons and $OH^-$ ions, which highly contribute to the redox reaction of color formation and extinction, is maintained in the electrochromic layer 4/14. A large quantity of $H^+$ protons and $OH^-$ ions is present especially in the interface between the reflective-conductive coating 5/11 and the sealing resin 6/16.

In order to maintain the redox reaction of color formation and extinction at a normal level, it is necessary to block ion migration, particularly ions radiating outward from the interface and entering into the interface. In order to maintain the constant quantity of the ions in the conventional mirror 1/11, the sealing glass plate 7/17 is attached on the sealing resin 6/16 so as to prevent an increase in water content and to prevent ion migration.

For the above reason, conventionally, the sealing glass plate 7/17 must be placed on the sealing resin 6/16, and no alternative idea has been available to block ion migration. In the conventional technology, the sealing resin material has been selected simply in view of sealing properties, not in view of blocking ion migration. For example, acrylic resin or urethane resin for general use is used as a material for conventional sealing resin 6/16.

However, such a resin material has a low density due to its structure constituted by a single polymer which is a straight chain polymer. For example, the acrylic resin is shown as follows:

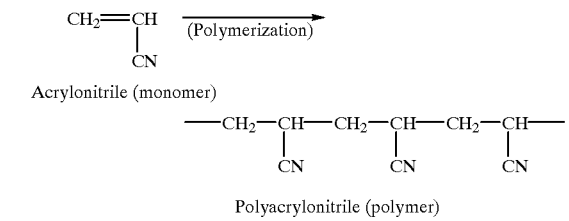

Such a low-density resin material is likely to absorb water and humidity. Thus, it cannot maintain the water content at a constant level, and it cannot block ion migration. Accordingly, the quantity of ions fluctuates.

FIG. 3 shows an embodiment of the present invention, in which the resin film 22 covers the electrochromic layer 4 and the reflective-conductive coating 5 from the back and the sides. The resin film 22 serves not only to seal and protect the electrochromic layer 4 and reflective-conductive coating 5 but also to block ion migration.

In the present invention, to realize resistance to water and moisture, and to block ion migration, the resin film 22 is made of a material such as a high-density polymer (e.g., a molecule weight of preferably 100,000–1,000,000) having a three-dimensional structure made of different monomers.

Water molecules are blocked by a low-density polymer having a tree-dimensional structure, but through which ions are able to pass, because the ions are smaller than water molecules in size. Thus, in the present invention, a high-density polymer having a three-dimensional structure is used as the sealing resin film 22 to prevent ions from migrating. It is truly effective for blocking ions to use a high-density polymer having a three-dimensional structure made of different monomers, each of which contains a large quantity of oxygen radicals. This may be because unreacted oxygen radicals in the resin film 22 catch $H^+$ or $OH^-$ in the interface between the resin film and the reflective-conductive coating 5, consequently blocking the ions.

For example, a silicon type resin, shown in the following chemical structure (1), is a high-density polymer having a three dimensional structure, so that the silicon type resin catches $H^+$ or $OH^-$ effective in providing resistance to water and moisture and in blocking ion migration (as shown in diagram (2)). A urethane type resin also catches $H^+$ or $OH^-$ and is effective in providing resistance to water and moisture, and in blocking ion migration (as shown in diagram (3)).

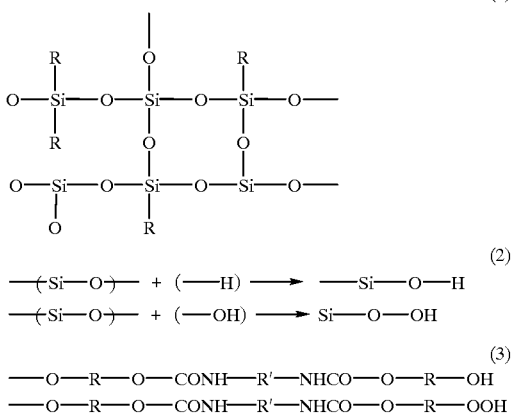

In view of resistance to water and moisture and blocking of ion migration, as well as protective function as a seal, suitable materials for the resin film of the invention include, for example, denatured epoxy type resins, denatured acrylic type resins, denatured urethane type resins, all of which easily adhere to the electrochromic layer 4 and the reflective-conductive coating 5. In addition, a silicone resin varnish or silicone resin enamel can be used.

When the resin film 22 contains metal oxide, ceramic powder, or glass powder, its strength and resistance to water and moisture can be improved. The resin film 22 is formed at a thickness of 50~100 μm by a process such as flow coating, blow coating, spin coating, and printing.

When the above mentioned resin film 22 is covered with a rubber type adhesive seat or plastic seat 23 in order to eliminate an air layer from the interface between the resin film 22 and the rubber type adhesive seat or plastic seat 23, the surface of the resin film 22 remains unchanged, so that the resin film 22 is effectively improved in terms of strength, resistance to water, moisture, and corrosion. The plastic seat is formed by bonding a plastic material onto the surface of the resin film 22 or coating the surface with the plastic material.

Figure 4:
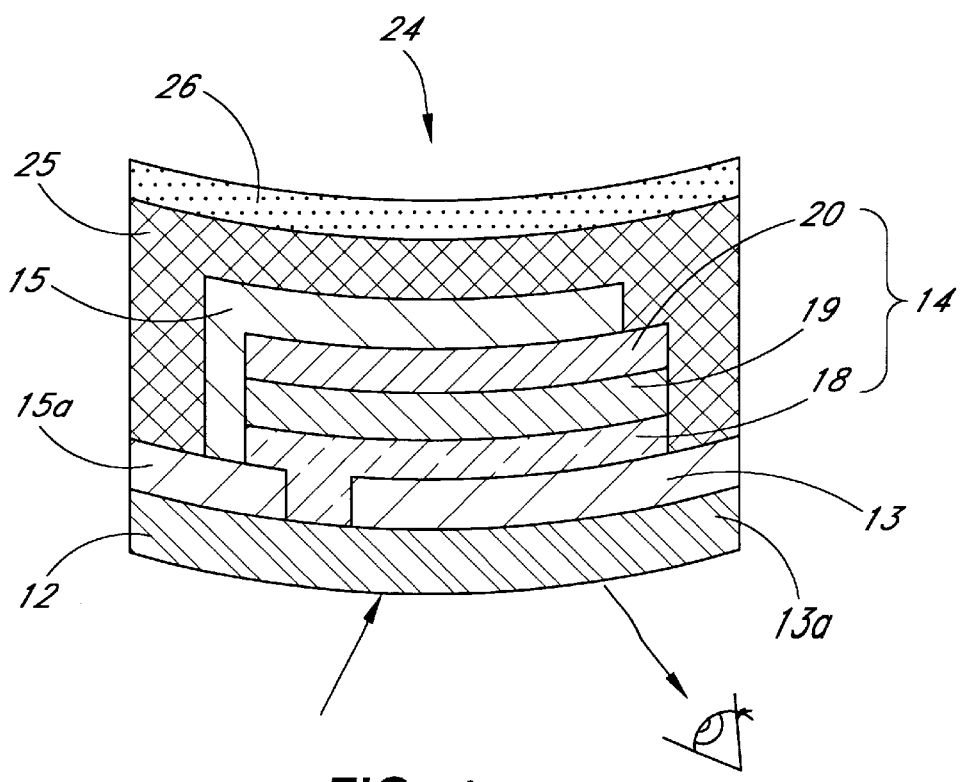
FIG. 4 is a schematic cross-sectional view of another embodiment of an all-solid electrochromic anti-glare mirror according to the present invention.

FIG. 4 shows another embodiment of the invention, which is an electrochromic anti-glare mirror 24 of a curved type. The curved type mirror 24 comprises a transparent glass substrate 12, a transparent conductive coating 13, an all-solid electrochromic layer 14, and a conductive coating 1S which also serves as a reflective element (a reflective-conductive coating). These elements are formed at a desired curvature, and as a result, the whole structure of the mirror is curved at the desired curvature.

The all-solid electrochromic layer 14 comprises an iridium oxide film 18 as an oxide color-forming film, a $Ta_2O_5$ film 19 as an electrolyte film, and a $WO_3$ film 20 as a reductive color-forming film. The conductive coating 25 comprises an Al film. These films 18, 19, 20 are laminated by a process such as vapor deposition.

The electrochromic layer 14 and the reflective-conductive coating 5 are covered with a resin film 25 from the back and the sides. The surface of the resin film 25 is curved. The resin film 25 serves as a seal to protect the electrochromic layer 14 and the reflective-conductive coating 5, and to block the ion migration. The material of the resin film 25 is the same as the resin film 22 of the first embodiment.

When the resin film 25 is covered with a rubber type adhesive seat or plastic seat 26 to eliminate an air layer from the interface between the resin film 25 and the rubber type adhesive seat or plastic seat 26, the surface of the resin film 25 remains unchanged, so that the resin film 25 is effectively improved in terms of strength, resistance to water, moisture, and corrosion. The plastic seat is formed by bonding a plastic material onto the surface of the resin film 25 or coating the surface with the plastic material.

The technical significance of the first and the second embodiments of the present invention will be described below. The resin film 22/25 is used to support the electrochromic layer 4/14 and the reflective-conductive coating 5/15 by providing mechanical strength from the outer surface, and increasing corrosion resistance. Further, the resin film is made of a material having resistance to water and moisture and functioning to block ion migration, so that the resin film 22/25 serves to prevent $H^+$ protons and $OH^-$ ions from being discharged from and being absorbed into the electrochromic layer 4/14, thereby maintaining the redox reaction for color formation and extinction at a normal level.

According to the present invention, the electrochromic anti-glare mirror 21/24 becomes lightweight because no sealing glass plate of the conventional mirror is used. The electrochromic anti-glare mirror 24 of the invention particularly eliminates the use of the sealing glass plate having an accurate curvature, thereby not only making the mirror light but also decreasing the cost of production. In the conventional electrochromic anti-glare mirror 11 of a curved type, an inaccurate curvature of the sealing glass plate 17 causes an uneven gap and an uneven thickness of the sealing resin disposed between the sealing glass plate 17 and the glass substrate 12. The unevenness thereof causes internal stress in the mirror, whereby the elements of the mirror 11 are easily separated or detached. However, the mirror 24 of the invention has no sealing glass plate such as the sealing glass plate 17, thereby eliminating the problem.

Further, when the resin film 22/25 is covered with a rubber type adhesive seat or plastic seat 23/26, the resin film 22/25 is given a higher mechanical strength as well as higher resistance to water, moisture, and corrosion.

According to the invention, the following effects are demonstrated:

(1) The electrochromic anti-glare mirror has no sealing glass plate, thereby not only making the mirror light but also decreasing production costs, especially in the case of the curved type mirror in which the sealing glass is required to be manufactured accurately at a curvature.

(2) The mirror of the invention has no sealing glass plate such as the sealing glass plate 17, thereby eliminating problems such as separation of the elements.

(3) The resin film is made of a material having a high mechanical strength and resistance to corrosion, water, and moisture and functioning to block the ion migration, thereby preventing $H^+$ protons and $OH^-$ ions from being discharged from and being absorbed into the electrochromic layer, accordingly to maintain redox reaction for color forming and extinguishing at a normal level.

(4) When the resin film is covered with a rubber type adhesive seat or plastic seat, the resin film is given a higher mechanical strength as well as higher resistance to water, moisture, and corrosion.

What is claimed is:

1. An all-solid electrochromic anti-glare mirror comprising in an upward direction:

(a) a transparent glass substrate;

(b) a transparent conductive coating formed on top of the transparent glass substrate, said transparent conductive coating being adapted to be connected to a terminal of an electric power source;

(c) an all-solid electrochromic layer formed on top of the transparent conductive coating;

(d) a reflective-conductive coating formed on top of the electrochromic layer, said reflective-conductive coating being adapted to be connected to another terminal of the electric power source;

(e) a resin layer covering outer surfaces of the electrochromic layer and the reflective-conductive coating, said surfaces being not in contact with the transparent conductive coating or the transparent glass substrate, said resin layer being made of a polymer comprising plural types of monomers and having a three dimensional structure such that passage of water molecules and ions therethrough is prevented; and (f) no sealing glass plate adhering on top of the mirror.

2. An all-solid electrochromic anti-glare mirror according to claim 1, wherein said all-solid electrochromic layer comprises an oxide color-forming film, an electrolyte film, and a redox color-forming film.

3. An all-solid electrochromic anti-glare mirror according to claim 2, wherein said oxide color-forming film is an iridium oxide film, said electrolyte film is a $Ta_2O_5$ film, and said redox color-forming film is a $WO_3$ film.

4. An all-solid electrochromic anti-glare mirror according to claim 1, wherein said resin layer is made of a material selected from the group consisting of denatured epoxy resin, denatured acrylic resin, denatured urethane resin, silicone rubber, and silicone.

5. An all-solid electrochromic anti-glare mirror according to claim 1, wherein said resin layer further comprises metal oxide, ceramic powder, or glass powder.

6. An all-solid electrochromic anti-glare mirror according to claim 1, wherein said resin layer is covered with a rubber adhesive or plastic seat to protect the top surface of the resin layer.

7. An all-solid electrochromic anti-glare mirror according to claim 6, wherein said rubber adhesive or plastic seat adheres to the top surface of the resin layer or is formed by coating the top surface of the resin layer with a material forming the seat.

8. An all-solid electrochromic anti-glare mirror according to claim 1, wherein said resin layer has a thickness of 50–100 $\mu$m.

9. An all-solid electrochromic anti-glare mirror according to claim 1, which is curved and has a downward convex surface of the transparent glass substrate.

10. In an all-solid electrochromic anti-glare mirror comprising in an upward direction: (a) a transparent glass substrate; (b) a transparent conductive coating formed on top of the transparent glass substrate, said transparent conductive coating being adapted to be connected to a terminal of an electric power source; (c) an all-solid electrochromic layer formed on top of the transparent conductive coating; (d) a reflective-conductive coating formed on top of the electrochromic layer, said reflective-conductive coating being adapted to be connected to another terminal of the electric power source; (e) a seal material covering outer surfaces of the electrochromic layer and the reflective-conductive coating, said surfaces being not in contact with the transparent conductive coating or the transparent glass substrate;

wherein the improvement comprises the seal material being made of a polymer comprising plural types of monomers and having a three dimensional structure such that passage of water molecules and ions therethrough is prevented.

11. The improvement according to claim 10, wherein said polymer is made of a material selected from the group consisting of denatured epoxy resin, denatured acrylic resin, denatured urethane resin, silicone rubber, and silicone.

12. The improvement according to claim 10, wherein said polymer further comprises metal oxide, ceramic powder, or glass powder.

13. The improvement according to claim 10, wherein said polymer is covered with a rubber adhesive or plastic seat to protect the top surface of the polymer.

14. The improvement according to claim 10, wherein the mirror is curved and has a downward convex surface of the transparent glass substrate.

* * * * *